(12) United States Patent  (10) Patent No.: US 9,188,440 B2
Carlson et al.  (45) Date of Patent: Nov. 17, 2015

(54) HIGH PRECISION HAND-HELD ENGINEERING SURVEY/POSITION DATA COLLECTOR TABLET COMPUTER

(75) Inventors: Robert Bruce Carlson, Maysville, KY (US); William C. Herter, Gastona, NC (US)

(73) Assignee: CARLSON SOFTWARE, INC., Maysville, KY (US)

( * ) Notice: Subject to any disclaimer, the term of this patent is extended or adjusted under 35 U.S.C. 154(b) by 524 days.

(21) Appl. No.: 13/607,685

(22) Filed: Sep. 8, 2012

(65) Prior Publication Data

US 2013/0245946 A1  Sep. 19, 2013

Related U.S. Application Data

(63) Continuation-in-part of application No. 12/826,056, filed on Jun. 29, 2010, now abandoned.

(60) Provisional application No. 61/539,321, filed on Sep. 26, 2011, provisional application No. 61/222,544, filed on Jul. 2, 2009.

(51) Int. Cl.
*G01C 15/00* (2006.01)
*G01S 19/42* (2010.01)
(Continued)

(52) U.S. Cl.
CPC ............... *G01C 15/00* (2013.01); *G01S 19/14* (2013.01); *G06F 1/1656* (2013.01); *G06F 1/1684* (2013.01); *G01D 9/005* (2013.01); *G01S 19/35* (2013.01)

(58) Field of Classification Search
CPC ..... G01C 15/00; G06F 1/1656; G06F 1/1684; G01S 19/05; G01S 19/07; G01S 19/13; G01S 19/32; G01S 19/40–19/44; G01S 19/51; G01S 5/04; G01S 5/14
See application file for complete search history.

(56) References Cited

U.S. PATENT DOCUMENTS 5,903,235 A  5/1999 Nichols
7,412,548 B2 *  8/2008 Sichner ........................ 710/62
(Continued)

OTHER PUBLICATIONS (Blickenstorfer) GPS, altimeter, e-compass, camera, hi-res display make this fully rugged Windows Mobile PDA perfect for all sorts of GPS, GIS, surveying, and rescue applications, [Retrieved on Aug. 11, 2010 from RuggedPCreview.com, <URL:http://ruggedpcreview.com/3_handhelds_getac_ps535f.html>] Mar. 1, 2009 entire document.

(Continued)

*Primary Examiner* — Toan Le
(74) *Attorney, Agent, or Firm* — Davis, Malm & D'Agostine P.C.

(57) ABSTRACT

A self-contained, hand-held, wireless engineering survey data collection system and method includes a survey data collector ruggedized to MIL-STD-810G, having a housing with a hand-held, tablet, form factor, and a processor, memory module, data storage, power source, and a full personal computer operating system. A user interface is supported by the housing and communicably coupled to the processor. A survey module configures the processor, memory module, data storage, and user interface to capture and store engineering survey data. Communications ports enable communication with peripheral devices. A survey-grade GNSS module configured for positioning accuracy within a margin of error of 3 cm, is supported by the housing and communicably couplable to the processor. An internal GNSS antenna is supported by the housing and communicably coupled to the GNSS module. The survey data collector is thus configured to capture engineering survey data including position data generated by the GNSS module.

20 Claims, 7 Drawing Sheets

(51) Int. Cl.
*G06F 1/16* (2006.01)
*G01S 19/14* (2010.01)
*G01S 19/35* (2010.01)
*G01D 9/00* (2006.01)

(56) References Cited

U.S. PATENT DOCUMENTS

| | | | |
|---|---|---|---|
| 8,099,603 B2* | 1/2012 | Libin et al. | 713/185 |
| 2002/0190957 A1 | 12/2002 | Lee et al. | |
| 2005/0010361 A1 | 1/2005 | Runkel et al. | |
| 2005/0116857 A1 | 6/2005 | Martin et al. | |
| 2006/0054704 A1 | 3/2006 | Fitch et al. | |
| 2006/0209031 A1 | 9/2006 | Burrell, IV | |
| 2007/0139262 A1 | 6/2007 | Scherzinger | |
| 2008/0308631 A1 | 12/2008 | Mitschele et al. | |
| 2010/0079333 A1* | 4/2010 | Janky et al. | 342/357.02 |

OTHER PUBLICATIONS (Juniper Allegro) Allegro Data Collector [Retrieved on Aug. 11, 2010 from Survey Systems,<URL:http//www.icmsurveysystems.com/allegro_data_collector.htm>] Oct. 26, 2004 [Retrieved from WayBack Machine] entire document.

(Leica SR510) Leica SR510 GPS Survey Receiver [Retrieved on Aug. 11, 2010 from ESRI Thailand, <URL:http://www.esrith.com/Support/document/GPSSystem500_SR510_Brochure.pdf>1999 entire document.

(Mapuser) Trimble's New Rugged Data Collector Streamlines Field and Office Surveying with Wireless Operation [Retrieved on Aug. 11, 2010 from American Surveyor, ,URL:http://www.amerisurv.com/content/view/2618/2/>] Jul. 18, 2005 entire document.

* cited by examiner

HIGH PRECISION HAND-HELD ENGINEERING SURVEY/POSITION DATA COLLECTOR TABLET COMPUTER

RELATED APPLICATION

This application claims the benefit of U.S. Provisional Application Ser. No. 61/539,321, entitled Ruggedized Tablet RTK GNSS Survey System, filed on Sep. 26, 2011, the contents of which are incorporated herein by reference in their entirety for all purposes. This application is also a Continuation-In-Part of U.S. patent application Ser. No. 12/826,056, entitled High Precision Hand-Held Engineering Survey/Position Data Collector, filed on Jun. 29, 2010 now abandoned, which itself claims the benefit of U.S. Provisional Application Ser. No. 61/222,544, entitled High-Precision GPS Expansion Pack for Handheld Computer, filed on Jul. 2, 2009, the contents all of which are incorporated herein by reference in their entireties for all purposes.

BACKGROUND

1. Technical Field

This invention relates to engineering surveying and data collection, and more particularly to a ruggedized hand held data collector capable of providing high precision, survey-grade GPS positioning, e.g., with accuracy to within 3 centimeters, while providing various alternate means of wireless communication.

2. Background Information

Throughout this application, various publications, patents and published patent applications are referred to by an identifying citation. The disclosures of the publications, patents and published patent applications referenced in this application are hereby incorporated by reference into the present disclosure.

High precision GPS (Global Positioning Satellite) receivers are commonly used in the surveying and construction industries. However, devices using these high precision GPS receivers have tended to be cumbersome and not well integrated for these industries. For example, users in these industries were required to carry a GPS receiver box in a backpack and move about a survey/construction site with a GPS antenna on a pole, and a data collector, with cables connecting the various components. Later, equipment manufacturers began to place the GPS receiver box on the pole, often mounted halfway up the pole below the antenna, sometimes integrated with the antenna. This was generally considered to be an improvement, but the pole tended to be top-heavy. Moreover, while hand-held GPS devices are available, such devices generally only provide low accuracy, e.g., 3-6 foot accuracy in real-time, while accuracy within about 3 cm or less is desired for surveying/construction applications. These conventional low precision devices also tend to be single purpose devices and/or consumer grade devices which are generally unsuitable for use in an engineering surveying environment where they are expected to be subjected to generally rough handling and potentially severe environmental conditions.

Users must typically carry additional devices, such as two-way radios, cell phones, and internet connectable devices for communication and data transfer. The need for multiple devices is often exacerbated by the different competing formats/protocols that are in use. For example, for positioning, both the GPS (Global Positioning Satellite) system operated by the U.S., and the GLONASS (Global Navigation Satellite System) operated by Russia, may be used, which typically requires mutually distinct receivers. Similarly, conventional point to point two-way radio may be needed for voice communication in areas lacking cellular coverage, while cellular communication may be used in other locales. Data transfer may require yet additional formats/protocols, including 802.11x and/or cellular/3G, etc., depending on the installed base of legacy equipment currently in use by a particular user/organization.

Thus, a need exists for a single device capable of addressing one or more of the aforementioned unresolved issues.

SUMMARY

In one aspect of the invention, a self-contained, hand-held, wireless engineering survey data collection system includes a survey data collector having a housing with a hand-held form factor, and a processor, memory module, data storage, and power source disposed within the housing. A user interface including input and output devices is supported by the housing and communicably coupled to the processor. A survey module including computer readable instructions disposed in a non-transitory computer readable medium, configures the processor, memory module, data storage, and user interface to capture and store engineering survey data. A plurality of communications ports are configured for communicating with peripheral devices. The survey data collector is ruggedized to MIL-STD-810F. In addition, a survey-grade GPS module configured for positioning accuracy within a margin of error of 3 cm, is supported by the housing and communicably couplable to the processor. A GPS antenna port is supported by the housing and communicably couplable to the GPS module. The survey data collector is thus configured to capture engineering survey data including position data generated by the GPS module.

In another aspect of the invention, a method of fabricating a self-contained, hand-held, wireless engineering survey data collection system, includes providing a survey data collector having a housing with a hand-held form factor; a processor, memory module, data storage, and power source disposed within the housing; and a user interface including input and output devices supported by the housing and communicably coupled to the processor. A survey module including computer readable instructions is disposed in a non-transitory computer readable medium, for configuring the processor, memory module, data storage, and user interface to capture and store engineering survey data. A plurality of communications ports are configured for communicating with peripheral devices, and the survey data collector is ruggedized to MIL-STD-810F. A survey-grade GPS module configured for positioning accuracy within a margin of error of 3 cm is supported with the housing and is configured to be communicably couplable to the processor. A GPS antenna port is supported with the housing and configured to be communicably couplable to the GPS module. The survey data collector is thus configured to capture engineering survey data including position data generated by the GPS module.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

TERMINOLOGY

Where used in this disclosure, the term "computer" is meant to encompass a workstation, personal computer, personal digital assistant (PDA), wireless telephone, or any other suitable computing device including a processor, a computer readable medium upon which computer readable program code (including instructions and/or data) may be disposed, and a user interface. Terms such as "component," "module", "control components/devices," and the like are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server (or control related devices) can be components. One or more components may reside within a process and/or thread of execution and a component may be localized on one computer and/or distributed between two or more computers or control devices. The terms "real-time" and "on-demand" refer to sensing and responding to external events nearly simultaneously (e.g., within milliseconds or microseconds) with their occurrence, or without intentional delay, given the processing limitations of the system and the time required to accurately respond to the inputs. The term GPS or Global Positioning Satellite, is used for convenience to refer to substantially any system capable of determining three-dimensional geographical position coordinates with survey-grade precision (to within 3 cm or less) including the aforementioned GLONASS system or any other system currently existing or developed in the future, capable of providing such high precision positioning, with our without orbiting satellites. For example, it is envisioned that such a future system may include a cellular or WiFi based system capable of determining position based on triangulation, or trilateration, etc., from multiple cell towers or WiFi sites, etc.

Programming Languages

The systems and methods embodying the present invention can be programmed in any suitable language and technology, such as, but not limited to: C++; Visual Basic; Java; VBScript; Jscript; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400.

Embodiments of the present invention include a wireless engineering survey data collection system in the form of a ruggedized handheld computer configured for engineering survey data collection, wireless connectivity via multiple alternative formats/protocols, and high precision, survey-grade positioning data capture via multiple formats/protocols. These embodiments are thus configured for use with Real Time (RTK) GNSS (Global Navigation Satellite System such as GPS or GLONASS) and Total Stations with in-field coordinate geometry.

Figure 1A:
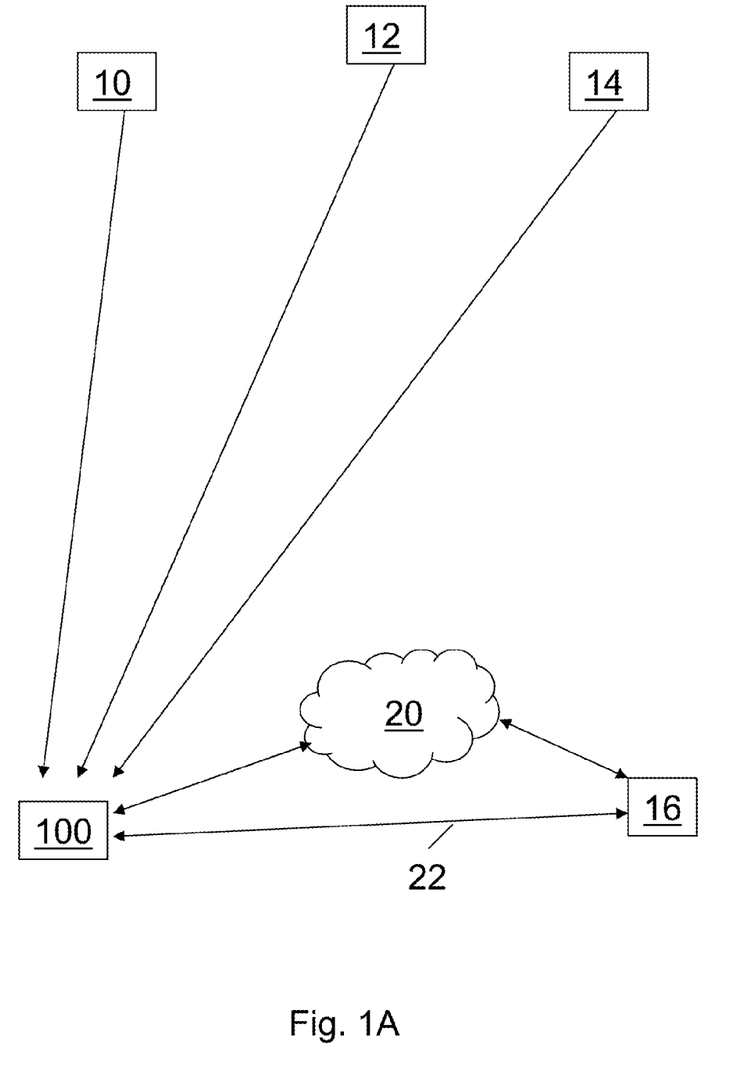
FIG. 1A is a schematic diagram of one embodiment of a system of the present invention in a representative application.

Turning to FIG. 1A, a data collection system 100 of the present invention is provided with multiple channels of communication, including receipt of signals from a series of navigation satellites 10, 12, 14, etc., and cellular communication to a Total Station or other third party 16 via a network such as a cellular network and/or internet 20. System 100 may also communicate directly with third party 16 via a point-to-point (e.g., radio) communication as shown at 22.

Figure 1B:
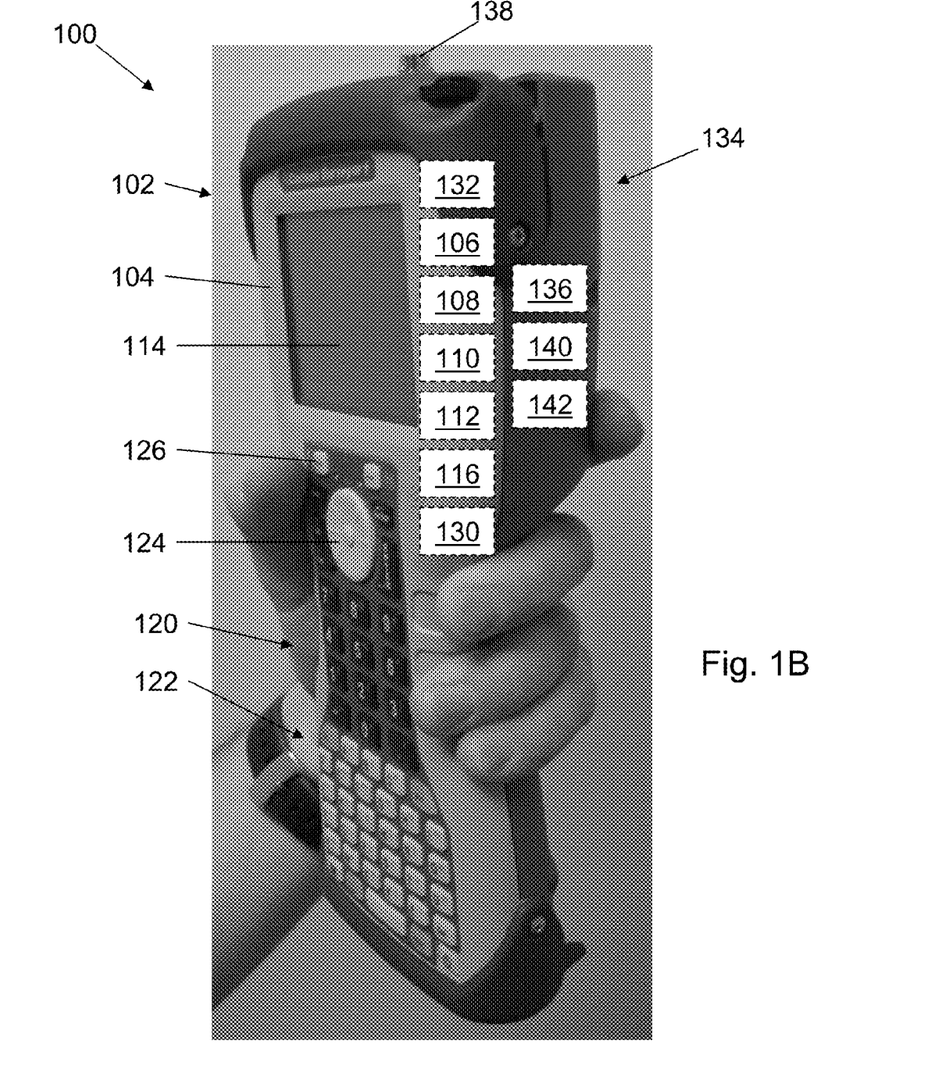
FIG. 1B is a perspective view of an embodiment of the system of FIG. 1A, with various optional and/or internal components shown schematically in phantom.

Turning to FIG. 1B, an exemplary engineering survey data collection system 100 is shown. This system 100 includes a survey data collector 102 in the form of a housing 104 having a hand-held form factor. A processor 106, memory module 108, data storage/static memory 110, and power source (e.g., rechargeable battery or supercapacitor) 112, all shown schematically in phantom, are disposed within the housing 104.

The data collector 102 also includes a user interface including input and output devices supported by the housing and communicably coupled to the processor 106. In particular embodiments, the user interface includes a screen 114, which may take the form of a touchscreen configured for enabling both input and output. Moreover, in particular embodiments the user interface is configured for operation with a gloved hand. In this regard, the screen 114 may take the form of a conventional resistive touchscreen which is not dependent on the capacitance provided by an ungloved finger. Optionally, the user interface may include a voice activation module 116 (shown schematically in phantom), which in combination with an integral speaker and microphone (not shown), is capable of receiving user input in the form of voice commands, and/or providing audible output. The voice activation module may operate independently of, or in combination with, screen 114.

As also shown, in particular embodiments, the user interface may include a numeric keypad 120 and/or an alphabetic keypad 122. As shown, keypads 120 and 122 may be distinct from one another, such as to facilitate operation with a gloved hand. In addition, or as an alternative, keypads 120 and 122 may be displayed on demand by the screen 114. The user interface may include any number of additional optional elements such as a navigation pad 124 and/or dedicated function keys 126.

Although not required, in particular embodiments, the numeric keypad 120, the alphabetic keypad 122, and the screen 114 are all separate from one another as shown. Moreover, as mentioned above, the keypads 120, 122, and the navigation pad 124 may all be configured, e.g., sized, shaped and sufficiently spaced from one another as shown, for operation with a gloved hand.

A survey module 130, e.g., in the form of computer readable instructions disposed in a non-transitory computer readable medium such as static memory 110, is provided for configuring the processor 106, memory module 108, data storage 110, and user interface to capture and store engineering survey data. In a representative embodiment, survey module 130 (shown schematically in phantom) may include the Carlson SurvCE GPS software application available from Carlson Software, Inc., (Maysville, Ky.) the Assignee of the present application.

As a further option, one or more communication ports 132, also shown schematically in phantom, may be provided for enabling the data collector 102 to communicate with peripheral devices. For example, ports 132 may take the form of one or more conventional wireless modules/processors configured for Bluetooth and/or WiFi (802.11x) communication.

In the various embodiments described hereinabove, including any of the optional variations thereof, the housing 104 may be water and dust resistant to NEMA (National Association of Electrical Manufacturers) IP67 standards, while the entire data collector 102, including housing 104, may be ruggedized to meet one or more of the test methods of United States Military Standard MIL-STD-810F (U.S. Department of Defense Test Method Standard for Environmental Engineering Considerations and Laboratory Tests), e.g., pertaining to Contamination by Fluids, Shock, Humidity, Solar Radiation, High Temperature, Low Temperature, etc.

As also shown, system 100 includes a module 134, which as shown, may take the form of a modular expansion pack supported by the housing and communicably couplable to the processor 106. In particular embodiments, the expansion pack 134 houses a survey-grade GPS receiver 136, e.g., configured for positioning accuracy within a margin of error of 3 cm or less. Optionally, the GPS module includes a multiple protocol/frequency receiver, e.g., to operate with either the U.S. GPS system, or substantially any other positioning system such as the aforementioned GLONASS Russian system, or other terrestrial geolocation systems. A GPS antenna port 138 may also be supported by the housing and communicably couplable to the GPS module, for connection to a conventional external GPS antenna (not shown). The various embodiments of the data collector 102 as described herein are thus configured to capture engineering survey data including position data generated by the GPS module.

In particular embodiments, the expansion pack 134 is configured for being selectively fastened to housing 102 when desired, and then removed from the housing 102 when not in use. However, it should be recognized that pack 134 may be fabricated as an integral, non-removable portion of the housing 104. As will be discussed in greater detail hereinbelow, the expansion pack 134 may be provided with a range of additional features, to enable the data collector 102 to be customized for individual users. For example, in some embodiments, the module 134 may be provided with a cellular transceiver 140, such as to provide the data collector 102 with Internet connectivity and/or wireless voice communication. In addition, or as an alternative, module 134 may be provided with a point-to-point audio transceiver 142, such as a spread spectrum audio transceiver to permit wireless radio communication in areas not covered by cellular networks. The system 100 may be provided with any number of additional features common to conventional survey equipment, such as a tripod hook, wrist strap, battery charger, etc. (not shown).

Embodiments shown and described herein thus provide a self-contained, hand-held, wireless engineering survey data collection system 100, which includes a removable, modular, expansion pack, for quick modification, in a plug-and-play manner to add or subtract functionality as needed for different applications. This approach provides a unique combination of GPS, computer, software, and multiple channel communication, in a hand-held form factor, while providing substantially the same GPS performance accuracy as other larger scale single-function survey-grade GPS receivers.

In exemplary embodiments, the data collector 102 may include a PDA or other handheld computer, modified in accordance with the teachings of the present invention. This computer may run the Windows CE™ or Windows Mobile™ operating systems (Microsoft Corporation, Redmond, Wash.), or substantially any other suitable operating system such as the Palm OS (Palm, Inc., Sunnyvale, Calif.), or Android (Google, Inc.) operating system, etc.

Particular embodiments, such as shown in FIG. 1B, include a ruggedized hand-held computer known as the Carlson Explorer 600+, commercially available from Carlson Software, Inc., which is configured to receive a modular expansion pack 134 including a GPS module, e.g., plugged into the back thereof, along with a relatively lightweight GPS antenna. The modular expansion pack may also include a radio module, such as a cellular telephone module as discussed above, to provide an internet link to GPS base stations and/or to office locations for data backup and transfer, all in a single, hand-held enclosure.

Thus, particular exemplary embodiments of the present invention provide a compact, high accuracy (to 3 cm or less), GPS enabled hand held computer that is linkable to the internet, for land surveying and construction positioning applications.

These embodiments may thus provide:

1. Removable, modular expansion pack.
2. Dual frequency GPS with positioning accuracy to within 3 cm.
3. Internet connection based on internal GSM/GPRS.
4. Internet GPS base station connection authentication via TCP Relay.
5. Radio for point-to-point communication.

It will be evident, however, to one skilled in the art that the present invention may be practiced without these specific details.

Figure 2:
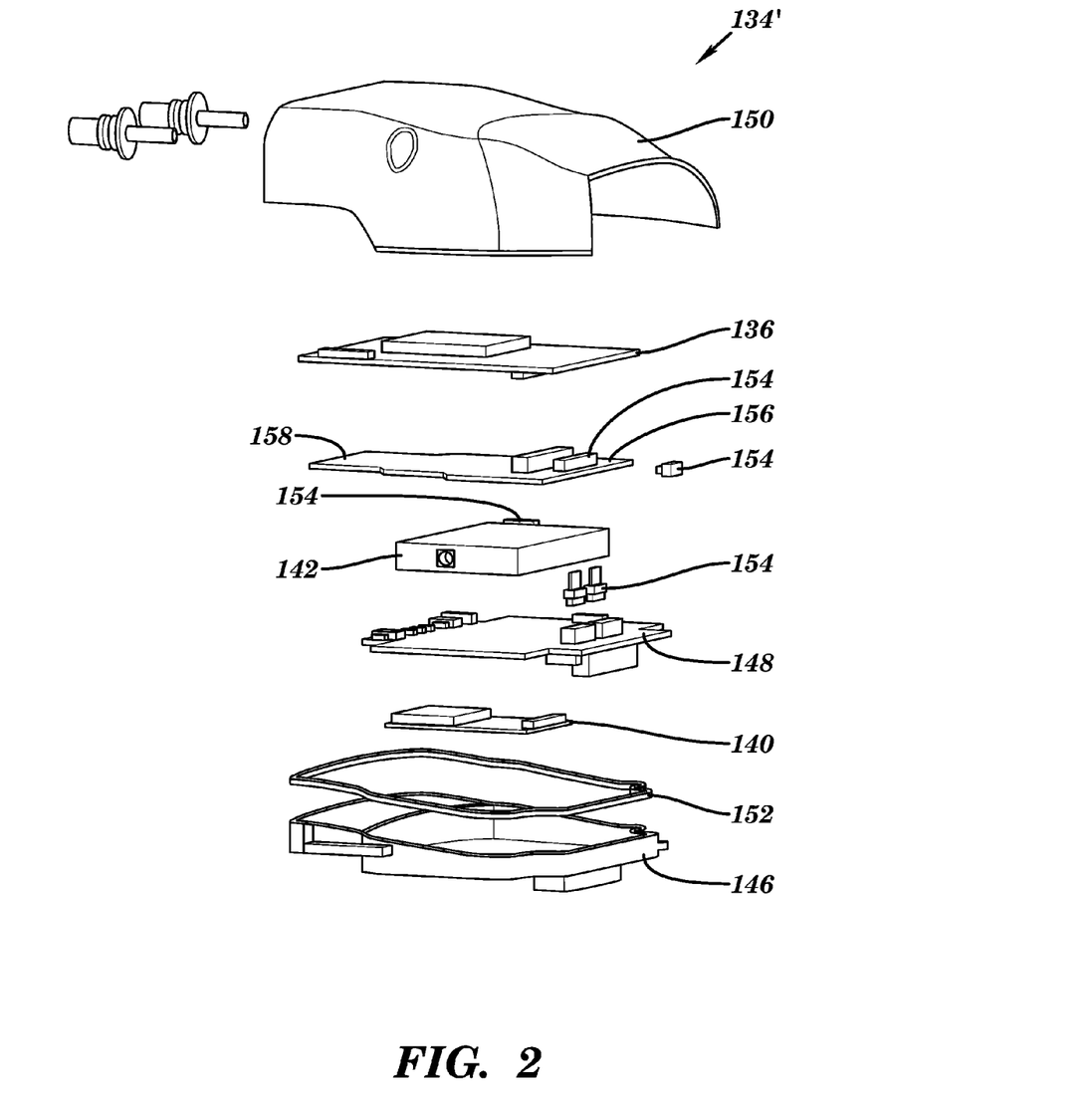
FIG. 2 is an exploded view of an alternate embodiment of an expansion module usable with the system of FIGS. 1A and 1B.
Figure 3:
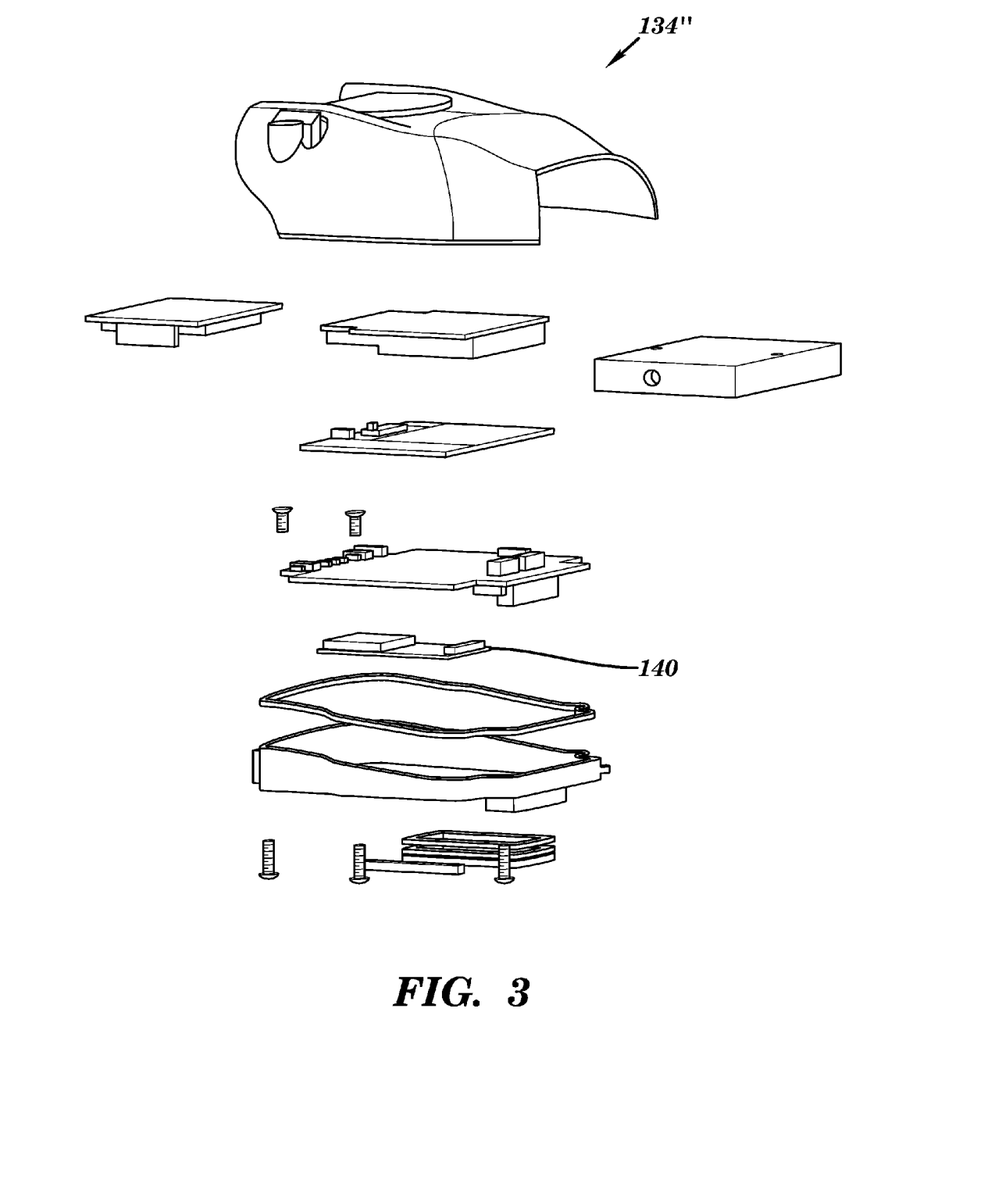
FIG. 3 is a view similar to that of FIG. 2, of another alternate embodiment of an expansion module usable with the system of FIGS. 1A and 1B.

Turning now to FIGS. 2 and 3, two different exemplary modular expansion pack modules for the handheld data collector 102 are shown: a larger size module shown at 134' in FIG. 2, and a smaller module shown as 134" in FIG. 3. One will recognize that a primary difference between the larger and smaller packs is the interior space available for various components. As shown, the expansion packs have been configured to permit the installation of a variety of different electronics modules. For example, the large expansion pack 134' is large enough to fit a survey-grade GPS receiver 136 (e.g., a Septentrio or Novatel GPS receiver board) in addition to cellular and radio modules 140, 142, while the smaller pack 134" may be configured to contain any two of the modules 136, 140, 142, such as a GPS receiver 136 and either a cellular or radio module 140, 142. Any desired combination of these modules may be provided, including, if desired, the use of both a cellular and radio module 140, 142 without the GPS receiver 136.

For example, referring specifically to FIG. 2, the large expansion pack 134' may be fitted with a GPS receiver 136 and a cell modem 140, with GPS receiver 136 and a radio module 142, or with all three components 136, 140, and 142 as shown.

Additional components of pack 134' may include a base 146, e.g., fabricated from a suitable plastic or metallic material, a printed circuit board assembly 148, e.g., having circuitry communicably couple the modules 136, 140, 142 to one another and to the data collector 102 (FIG. 1). Other components may include a cover 150, e.g., plastic or metallic, one or more gasket(s) 152 to form a weather-tight seal between the base 146 and cover 150, and various mounting/connecting hardware such as shown at 154.

As shown, the cell modem 140 may be supported by the printed circuit board 148, while the GPS receiver 136 and radio 142 may be supported by a carrier board 156. The carrier board may include electronic circuitry to power one or more of the modules (e.g., to convert the 5 volt power supplied by circuit board 148 to the 3.3 volts required by particular examples of the GPS and radio modules 136, 142) and to control power up and/or sleep mode states. Pack 124' may also include an internally mounted antenna (not shown) for any of the modules, e.g., the cell and radio modules 140, 142, and/or antenna connectors for externally mounted antennae (e.g., for GPS module 136).

It is also noted that in particular embodiments, as mentioned above, GPS board 136 may include a multi-frequency device, having the capability to use other systems such as the GLONASS system or terrestrial systems, etc., in addition to the aforementioned GPS system. It should also be recognized that cellular module 140 may be configured to operate on substantially any cellular protocols, such as both GSM and CDMA, etc.

Turning now to FIG. 3, the small expansion pack 134" is substantially similar to the large expansion pack, but may be sized, shaped and otherwise configured to include any two of the three modules 136, 140, 142. In the particular embodiment shown, radio module 142 includes any of at least three different radio modules, e.g., those commercially available from Maxstream, Futaba, or Cirronet. Pack 134" also includes a cell module 140 as shown. If desired, either of these modules 140, 142 may be replaced with a GPS module 136 (FIG. 2).

Additional components may be as shown and described hereinabove with respect to pack 134', including base 146', printed circuit board assembly 148', gasket(s) 152', cover 150', and various mounting hardware 154'.

In addition to the aspects discussed hereinabove, embodiments of the present invention may include various additional features such as additional serial ports, USB ports, 12 Volt DC input port, camera, and wireless networking modules (e.g., Bluetooth and/or 802.11x). It is also anticipated that the expansion packs may be modular, and installed and removed by end-users, e.g., using a common tool such as a coin or screwdriver, using quarter-turn screws or the like. A conventional snap-in mount may also be used.

Non-limiting examples of Radio Modems, GPS Boards, and Cellular Modems that may be used in embodiments of the invention are shown in the following Table 1:

TABLE I

Radios

Maxstream 9XTend 900 mHz Spread Spectrum Radio (MMCX),
Maxstream 24XStream 2.4 GHz Spread Spectrum Radio (MMCX),
Maxstream Xbee-Pro 2.4 Ghz Zig Bee Module,
Cirronet Wit2410 2.4 GHz Spread Spectrum Module,
Cirronet Wit2450 2.4 GHz Spread Spectrum Module,
Cirronet Wit2411 2.4 GHz Spread Spectrum Module,
Satel 3as ~460-480 mHz range.

GPS Boards

Novatel (www.novatel.com) OEMV-2 L1, L2 GPS,
Novatel OEMV-3 72 channel GPS.

Cellular Modems

Sierra Wireless (www.sierrawireless.com) MC8775 Cellular Modem
Siemens https://pia.khe.siemens.com/index14625.htm HC15, HC25 HDSPA Cellular Modem
Novatel Wireless Expedite Cellular Modems
Enfora (www.enfora.com) Enabler IIIG Quad band GSM/GPRS cellular modem
Wavecom
Embedded.net (www.embedded.net)

Figure 4:
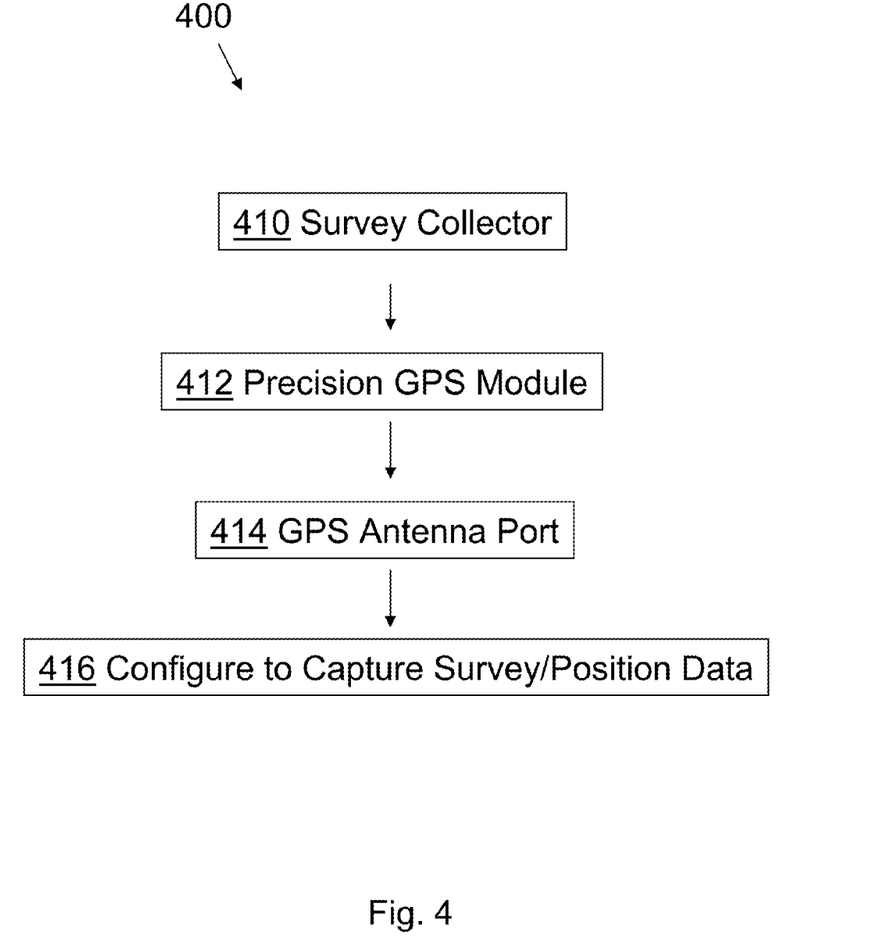
FIG. 4 is a flow chart of an exemplary method in accordance with an embodiment of the present invention.

A method of fabricating a self-contained, hand-held, wireless engineering survey data collection system will now be described as illustrated by the flow chart of FIG. 4. As shown, the method 400 commences with providing 410 a survey data collector substantially as shown and described hereinabove with respect to FIGS. 1B-3. At 412, a survey-grade GPS module is supported with the housing and configured to be communicably coupled to the processor, the GPS module being configured for positioning accuracy within a margin of error of 3 cm. At 414, a GPS antenna port is supported with the housing and configured to be communicably couplable to the GPS module. At 416, the survey data collector is configured to capture engineering survey data including position data generated by the GPS module.

In summary, it will be appreciated that the above described embodiments provide a convenient vehicle for capturing engineering survey/position data, including precision position data in real-time, using a convenient hand-held, wireless device capable of multiple means of wireless connectivity.

Figure 5:
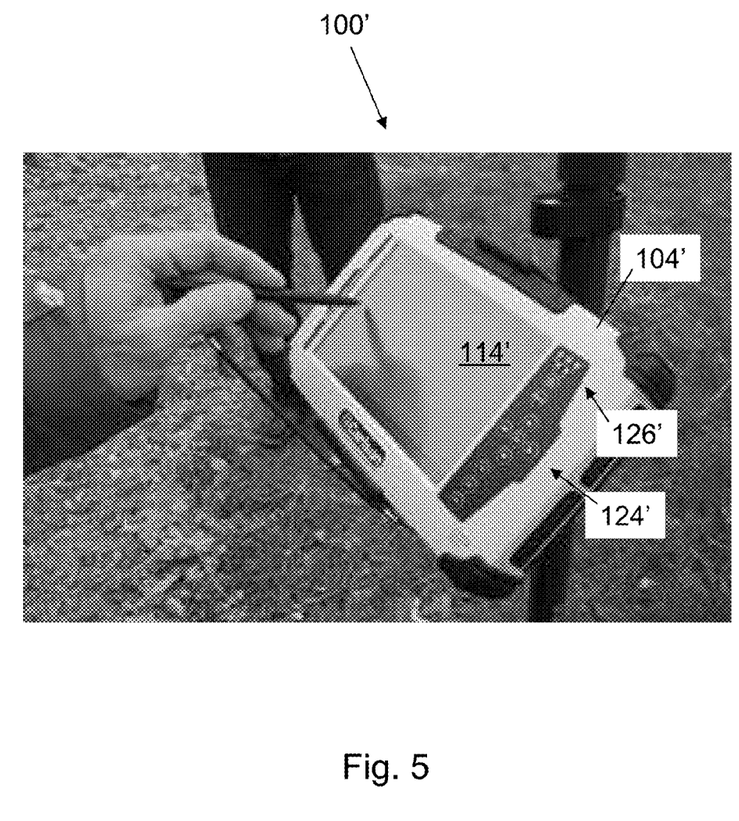
FIG. 5 is a view similar to that of FIG. 1B, of an alternate embodiment of the present invention.

Turning to FIG. 5, an alternate aspect of the present invention is shown as engineering survey data collection system 100'. System 100' is substantially similar to system 100 shown and described hereinabove with respect to FIG. 1B, with the exception of differences which are discussed hereinbelow. Notably, system 100' is disposed within a housing 104' having a hand-held, tablet, form factor as shown. As with system 100 described above, system 100' includes a user interface including input and output devices supported by the housing and communicably coupled to the processor 106. In particular aspects, the user interface includes a screen 114', which may take the form of a touchscreen configured for enabling both input and output. Screen 114' may be substantially similar to, though larger than, screen 114 of system 100.

In addition to keypads 120 and 122 (FIG. 1B) displayed on demand by the screen 114', the user interface may include any number of additional optional elements such as a navigation pad 124' and/or dedicated function keys 126'.

In the various embodiments described herein, including any of the optional variations thereof, the housing 104' may be water and dust resistant to NEMA (National Association of Electrical Manufacturers) IP65 standards, while also being ruggedized to meet one or more of the test methods of United States Military Standard MIL-STD-810G (U.S. Department of Defense Test Method Standard for Environmental Engineering Considerations and Laboratory Tests), pertaining to Environmental Conditions including Operating and Storage Temperatures, Vibration, Drop/Shock, Sand & Dust, Water, and Humidity.

In particular aspects, system 100' may include a modular expansion pack 134, 134', 134", etc., supported by the housing and communicably couplable to the processor 106, such as shown and described with respect to FIG. 1B hereinabove. However, in the aspect shown in FIG. 5, a survey-grade GNSS (e.g., GPS) receiver 136, e.g., configured for positioning accuracy within a margin of error of 3 cm or less, may be disposed within housing 104', without the need for an expansion pack. In particular embodiments, receiver 136 may provide an accuracy of 1 cm or less horizontally, and 2 cm or less vertically, e.g., using the OEM615™ GNSS receiver board from Novatel Inc. (Calgary, Alberta, CA). In some variations, system 100' may include a GPS antenna port 138 (FIG. 1B) supported by the housing and communicably couplable to the GPS receiver 136, for connection to a conventional external GPS antenna (not shown). However, in particular aspects, such as shown in FIG. 5, system 100' may be provided with an antenna-less housing 104' (e.g., supporting an internal GNSS antenna), to simplify use in the field and provide the housing 104' with enhanced resistance to environmental incursions. Thus, in particular applications, system 100' is capable of providing desired positioning accuracy using only an internal GNSS antenna.

In particular aspects, housing 104' may also be provided with cellular transceiver 140, such as to provide the data collector 102 with Internet connectivity and/or wireless voice communication. In addition, housing 104' may be provided with point-to-point audio transceiver 142, such as a spread spectrum audio transceiver to permit wireless radio communication in areas not covered by cellular networks.

System 100' thus provides a self-contained, hand-held, wireless engineering survey data collection system in the form of an industry hardened tablet computer. This approach provides a unique combination of GNSS (GPS), computer, software, and multiple channel communication, in a handheld tablet form factor, while providing substantially the same GPS performance accuracy as other larger scale single-function survey-grade GPS receivers. Moreover, contrary to conventional wisdom for handheld devices designed primarily for outdoor use, system 100' runs a full computer (i.e., desktop) operating system (e.g., Microsoft Windows 7™, available from Microsoft Corporation, Redmond, Wash.), or substantially any other full operating system such as the OS X (Apple, Inc., Cupertino, Calif.), or Linux operating system. Thus, as used herein, the terms "full operating system" and "desktop operating system" are used interchangeably with one another and consistently with the conventional definition of "desktop operating system" (desktop OS), to refer to the control program in a user's desktop or laptop computer. See, for example, the definition for desktop operating system at pcmag.com/encyclopedia. Moreover, this definition specifically excludes conventional mobile operating systems (mobile OS) which are built exclusively for mobile devices such as smartphones, personal digital assistants (PDAs), tablets or other embedded mobile OS, which are similar to desktop OS (such as the aforementioned Windows, Linux, and OS X) but are relatively simple and light and configured to primarily manage the wireless variations of local and broadband connections, mobile multimedia and various input methods. Examples of popular mobile operating systems are Android, Symbian, iOS. BlackBerry OS and Windows Mobile. See, for example, the definition for mobile operating system at techopedia.com.

One particular example of system 100' includes the ruggedized hand-held tablet computer known as the Carlson Supervisor+™ RTK GNSS Survey System, commercially available from Carlson Software, Inc., of Maysville, Ky., which provides an integrated, high accuracy survey grade RTK GNSS receiver and ultra mobile ruggedized Windows tablet PC. By combining a sunlight viewable touch screen ultra mobile ruggedized tablet PC with a high accuracy survey grade RTK GNSS receiver a user may collect survey grade measurements directly into a Windows PC operating system environment. The combination of these components as shown and described above, including the full operating system environment, enables mapping professionals to access the full computing power of a PC environment while in the field, collecting survey grade measurements.

Those skilled in the art will recognize that at the time of the instant invention, power consumption in mobile devices was a primary concern. It would therefore have been counterintuitive to use anything in a mobile device that would have been viewed as increasing power consumption relative to available alternatives. This would have been particularly true in the case of mobile, high accuracy survey grade GNSS devices, due to the relatively high power consumption of survey grade GNSS receivers. Those skilled in the art therefore would not have used a full operating system (OS) in a handheld with GNSS, but would have instead recognized that significant energy savings may be provided by using lighter, mobile operating systems such as Windows CE™, etc. The skilled artisan would have recognized that the power consumption issue would have been further exacerbated by the tablet form factor, due to the power needed to provide the tablet touchscreen with sufficient illumination as to be viewable outdoors, e.g., in direct sunlight. And as discussed hereinabove, it was counterintuitive to incorporate a GNSS board into a handheld form factor since industry standard was to use large pole with GNSS antenna at the top for accuracy. It would not have been expected that the 3-cm accuracy provided by the embodiments hereof, could have been achieved without a pole mounted external antenna, or with only the internal antenna of system 100'. The instant embodiments overcame these obstacles, to enable surveyors and engineers to perform surveying activities with a portable tablet that leverages full OS capabilities in the field, e.g., to enable online remote access for technical support, online bug fixes, online configuration, etc.

The following Tables II-IV include illustrative examples of certain aspects of the present invention, and are not intended to limit the present invention to any one particular aspect or set of features.

TABLE II

| RTK GNSS Windows Ultra Mobile Rugged Tablet |
|---|
| large data collector screen - 7" |
| fast data collector processor - 1.6 Ghz |
| Large memory - storage 64 Gb, RAM 2 Gb |
| Industry leading data collection software Carlson SurvPC |
| Novatel OEM615 GNSS receiver |
| Windows 7 Ultimate Operating System |

TABLE II-continued

RTK GNSS Windows Ultra Mobile Rugged Tablet

Bluetooth, Wifi, Cellular (cdma & gsm), 2 usb, 9 pin Serial, and Ethernet capable
Dual Hot Swappable Batteries
2 Megapixel camera with LED
Only 2.42 lbs
Upgradable from L1 GNSS GIS to full RTK GNSS

TABLE III

| | Supervisor Tablet Specifications |
|---|---|
| Size | 5.56" (144 mm) × 9.5" (242 mm) × 1.57" (40 mm) |
| Weight | 1.1 kg (2.42 lb) |
| Environment | |
| Operating: | −9.4° F. to 140° F. (−23° C. to 60° C.), MIL-STD-810G, Method 501.4 Procedure II, MIL-STD 810G, Method 502.4, Procedure I, II, III |
| Storage: | −40° F. to 158° F. (−40° C. to 70° C.) MIL-STD-810G, Method 501.4 Procedure II, MIL-STD 810G, Method 502.4, Procedure I, II, III |
| Drop: | MIL-STD-810G 4 ft Drop, Free to Concrete. 26 drops from 4 ft (1.22 m) MIL-STD-810G, Method 516.5, Procedure IV |
| Vibration: | MIL-STD-810G, Method 514.5 Procedures I & II, General minimum integrity and the more rigorous loose cargo test |
| Sand & Dust: | IP 65, MIL-STD-810G |
| Water: | IP 65, MIL-STD-810G |
| Humidity: | MIL-STD-810G, Method 507.4, 90% RH temp cycle 0° C./70° C. |
| Altitude: | 15,000 ft (4572 m) at 73° F. (22° C.) |
| Processor/Memory | Intel Ultra Low Power Atom 2530 1.6 GHz processor (w/US15W Chipset), 2 GB DDR2 RAM |
| Data Storage/Disk | 64 GB SSD solid state hard drive |
| Operating System | Microsoft Windows 7 Ultimate |
| Screen | 7" widescreen 1024 × 600 resolution TRT LCD, MaxView ™ sunlight readable resistive touchscreen display |
| Keyboard | 10 keys: Power key Menu key (Controls Brightness, Volume, Battery Status, WiFi & BT On/Off, and 3G On/Off) 4 + 1 Navigation/Directional keys (Left, Right, Up, Down, Center for Enter) 3 × User programmable hotkey buttons that control up to 6 functions On-screen QWERTY soft keyboard |
| Battery | Hot-swappable Dual Li-Polymer Battery Pack, 2600 mAh each, support minimum 6 hours operation |
| Connections | 2 × USB 2.0 port (one fully waterproof, even when the latch is open) 1 × 9-pin serial RS-232 port fully waterproof, even when the latch is open 1 × LAN 1 × DC power port Input: 120-240 VAC, 50-80 Hz, 12 VOC Output Docking Connector (Contact Pin Type) 1 × 4 Pin docking Audio Out 1 × Microphone Audio integrated (one speaker) Fully Gobi ™ 2000 PCIe module-ready |
| Communication | Wireless LAN 802.11b/g/n PAN: Integrated Bluetooth v.2.0 + EDR Compliant WWAN (Optional) Gobi ™ 2000 ready, supporting the following RF bands: Quad-band EDGE/GPRS/GSM - 850/900/1800/1900 MHz Dual-band Ev-DO/COMA - 800/1900 MHz |
| Navigation | u-blox GPS, WAAS/EGNOS capable |
| Camera | 2 Megapixel Camera + LED light |
| Options | 12 V vehicle charger, Pole mount solution, Vehicle cradle that includes: *1 × DC PWR *2 × USB *2 × RS232 *1 × 10/100LAN *VESA holes |

TABLE IV

Supervisor GPS Specifications

Performance[1]

Channel Configuration

120 Channels[2]
Signal Tracking
GPS: L1, L2, L2C
GLONASS: L1, L2
Galileo: E1
GIOVE-A/GIOVE-B (test)
Compass[3]
SBAS

Horizontal Position Accuracy (RMS)

| | |
|---|---|
| Single Point L1 | 1.5 m |
| Single Point L1/L2 | 1.2 m |
| SBAS[4] | 0.6 m |
| DGPS | 0.4 m |
| RT-20[5] | 0.2 m |
| RT-2 ™ | 1 cm + 1 ppm |
| Initialization time | <10 s |
| Initialization reliability | >99.9% |

Measurement Precision (RMS)
Fully independent code and carrier measurements:

| | GPS | GLO |
|---|---|---|
| L1 C/A Code | 4 cm | 8 cm |
| L1 Carrier Phase | 0.5 mm | 1 mm |
| L2 P(Y) Code[6] | 8 cm | 8 cm |
| L2 Carrier Phase[6] | 1 mm | 1 mm |
| L2C code[7] | 8 cm | 8 cm |
| L2C carrier phase[7] | 0.5 mm | 0.5 mm |

Data Rate[8]

| | |
|---|---|
| Measurements | up to 50 Hz |
| Position | up to 50 Hz |

Time to First Fix

| | |
|---|---|
| Cold Start[9] | <50 s |
| Hot Stare[10] | <35 s |

Signal Reacquisition

| | |
|---|---|
| L1 | <0.5 s (typical) |
| L2 | <1.0 s (typical) |

| | |
|---|---|
| Time Accuracy[11] | 20 ns RMS |
| Velocity Accuracy | 0.03 m/s RMS |
| Velocity Limit[12] | 515 m/s |

Physical and Electrical

| | |
|---|---|
| Dimensions | 46 × 71 × 11 mm |
| Weight | 24 g |

Power

| | |
|---|---|
| Input Voltage | +3.3 VDC [+/− 5%] |
| Power Consumption[13] | 1 W |

Antenna LNA Power Output

| | |
|---|---|
| Output Voltage | 5.0 VDC |
| Maximum Current | 100 mA |

Connectors

Main 20-pin dual row male header
Antenna Input MCX female

Communication Ports

3 LV-TTL up to 921,600 bps
2 CAN Bus[14] 1 Mbps
1 USB 12 Mbps

Environmental

Temperature

| | |
|---|---|
| Operating | −40° C. to +85° C. |
| Storage | −55° C. to +95° C. |
| Humidity | 95% non-condensing |

Vibration Temperature

| | |
|---|---|
| Random Vibe | MIL-STD 810G (7.7 g RMS) |
| Sine Vibe | IEC60068-2-6 (5 g) |
| Bump | ISO9022-31-06 |
| Shock | MIL-STD-810G (40 g) |

Features

Field-upgradeable software
PAC multipath mitigating technology
Differential GPS positioning
Differential correction support for RTCM 2.1, 2.3, 3.0, 3.1, CMR, CMR+ and RTCA
Navigation output support for NMEA-0183 and detailed NovAtel ASCII and binary logs
Auxiliary strobe signals, including a configurable PPS output for time synchronization and mark inputs
Outputs to drive external LEDs
GL1DE smoothing algorithm

Optional Accessories

GPS-700 series antennas
ANT series antennas
RF Cables - 5 and 10 m lengths
Development Kit

Firmware Options

| | |
|---|---|
| RT-2 | RT2-L1TE |
| RT-20 | RAIM |
| ALIGN | |

[1]Typical values. Performance specifications subject to GPS system characteristics, US DOD operational degradation, ionospheric and tropospheric conditions, satellite geometry, baseline length, multipath effects and the presence of intentional or unintentional interference sources.
[2]Tracks up to 60 L1/L2 satellites.
[3]The Compass signal is not finalized and changes in the signal structure may still occur. Designed for Compass Phase 3 compatibility.
[4]GPS only.
[5]Expected accuracy after static convergence.
[6]L2 P for GLONASS.
[7]L2 C/A for GLONASS.
[8]50 Hz while tracking up to 20 satellites.
[9]Typical value. No almanac or ephemerides and no approximate position or time.
[10]Typical value. Almanac and recent ephemerides saved and approximate position and time entered.
[11]Time accuracy does not include biases due to RF or antenna delay.
[12]Export licensing restricts operation to a maximum of 515 metres per second.
[13]Power consumption values for GPS L1/L2
[14]User application software required.

Figure 6:
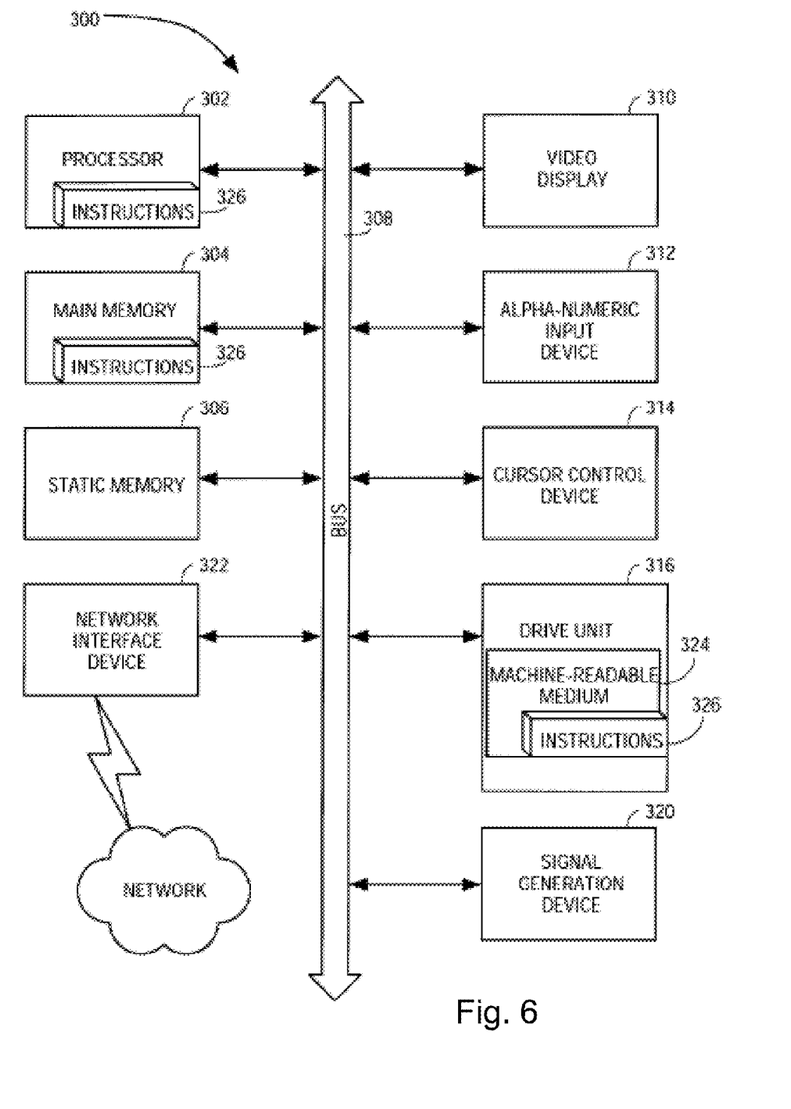
FIG. 6 is a block diagram of one embodiment of a computer system usable in various embodiments of the present invention.

FIG. 6 shows a diagrammatic representation of a machine such as usable in system 100, in the exemplary form of a computer system 300 within which a set of instructions for causing the machine to perform any one of the methodologies discussed above, may be executed. In alternative embodiments, the machine may include a Personal Digital Assistant (PDA), a cellular telephone, a web appliance or any machine configured in accordance with the teachings of the present invention, and capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.,) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Thus, a method and apparatus in accordance with the present invention have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

Furthermore, embodiments of the present invention include a computer program code-based product, which includes a computer readable storage medium having program code stored therein which can be used to instruct a computer to perform any of the functions, methods and/or modules associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic non-transitory memory or data storage devices.

It should be noted that the various modules and other components of the embodiments discussed hereinabove may be configured as hardware, as computer readable code stored in any suitable computer usable medium, such as ROM, RAM, flash memory, phase-change memory, magnetic disks, etc., and/or as combinations thereof, without departing from the scope of the present invention.

It should be further understood that any of the features described with respect to one of the embodiments described herein may be similarly applied to any of the other embodiments described herein without departing from the scope of the present invention.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

The above systems are implemented in various computing environments. For example, particular embodiments or portions thereof may be implemented on a conventional IBM PC or equivalent, multi-nodal system (e.g., LAN) or networking system (e.g., Internet, WWW, wireless web). All programming and data related thereto are stored in computer memory, static or dynamic or non-volatile, and may be retrieved by the user in any of: conventional computer storage, display (e.g., CRT, flat panel LCD, plasma, etc.) and/or hardcopy (i.e., printed) formats. The programming of the present invention may be implemented by one skilled in the art of computer systems and/or software design.

Having thus described the invention, what is claimed is:

1. A self-contained, hand-held, wireless engineering survey data collection system, comprising:
a survey data collector including:
a housing having a hand-held, tablet, form factor;
a processor, memory module, data storage, and power source disposed within the housing;
a full personal computer operating system;
a user interface including input and output devices supported by the housing and communicably coupled to the processor;
the user interface including a sunlight viewable touch screen;
a survey module including computer readable instructions disposed in a non-transitory computer readable medium, for configuring the processor, memory module, data storage, and user interface to capture and store engineering survey data;
a plurality of communications ports configured for communicating with peripheral devices;
a survey-grade GNSS (Global Navigation Satellite System) module disposed within the housing and communicably coupled to the processor, the GNSS module configured for positioning accuracy within a margin of error of 3 cm;
an internal GNSS antenna supported within the housing in operative engagement with the GNSS module;
the housing being ruggedized to at least MIL-STD-810G (U.S. Department of Defense Test Method Standard for Environmental Engineering Considerations and Laboratory Tests);
wherein the survey data collector is configured to capture engineering survey data including position data generated by the GNSS module.

2. The self-contained, hand-held, wireless engineering survey data collection system of claim 1, wherein the GNSS module is configured for positioning accuracy within a margin of error of 1 cm vertically and 2 cm horizontally.

3. The self-contained, hand-held, wireless engineering survey data collection system of claim 1, wherein the survey data collector is ruggedized to at least MIL-STD-810G for one or more environmental conditions selected from the group of Operating and Storage Temperatures, Vibration, Drop/Shock, Sand & Dust, Water, Humidity, and combinations thereof.

4. The self-contained, hand-held, wireless engineering survey data collection system of claim 3, wherein the survey data collector is ruggedized to at least MIL-STD-810G for each of Operating and Storage Temperatures, Vibration, Drop/Shock, Sand & Dust, Water, and Humidity.

5. The self-contained, hand-held, wireless engineering survey data collection system of claim 1, being water and dust resistant to NEMA (National Association of Electrical Manufacturers) IP65 standards.

6. The self-contained, hand-held, wireless engineering survey data collection system of claim 1, wherein the GNSS module comprises a dual frequency GNSS receiver.

7. The self-contained, hand-held, wireless engineering survey data collection system of claim 6, wherein the personal computer operating system comprises an operating system configured for at least x86 and x86-64 microprocessors.

8. The self-contained, hand-held, wireless engineering survey data collection system of claim 7, further comprising a cellular transceiver.

9. The self-contained, hand-held, wireless engineering survey data collection system of claim 8, further comprising a spread spectrum audio transceiver.

10. The self-contained, hand-held, wireless engineering survey data collection system of claim 1, wherein the plurality of communications ports include wireless communications ports.

11. The self-contained, hand-held, wireless engineering survey data collection system of claim 10, wherein the wireless communications ports are selected from the group consisting of Bluetooth and WiFi (802.11x) enabled ports.

12. The self-contained, hand-held, wireless engineering survey data collection system of claim 1, wherein the user interface comprises an input device configured for operation with a gloved hand.

13. The self-contained, hand-held, wireless engineering survey data collection system of claim 12, wherein the user interface comprises a navigation pad and a touchscreen.

14. The self-contained, hand-held, wireless engineering survey data collection system of claim 13, wherein the housing comprises a tripod hook.

15. A method of fabricating a self-contained, hand-held, wireless engineering survey data collection system, comprising:
   (a) configuring a housing having a hand-held, tablet form factor;
   (b) disposing a processor, memory module, data storage, and power source within the housing;
   (c) operatively engaging a full personal computer operating system with the processor, memory module, data storage and power source;
   (d) supporting a user interface including input and output devices, with the housing, and communicably coupling the user interface to the processor;
   (e) configuring the user interface to include a sunlight viewable touch screen;
   (f) providing a survey module including computer readable instructions disposed in a non-transitory computer readable medium, for configuring the processor, memory module, data storage, and user interface to capture and store engineering survey data;
   (g) configuring a plurality of communications ports for communicating with peripheral devices;
   (h) disposing a survey-grade GNSS (Global Navigation Satellite System) module within the housing and communicably coupling the GNSS module to the processor, the GNSS module being configured for positioning accuracy within a margin of error of 3 cm; and
   (i) supporting a GNSS antenna within the housing in operative engagement with the GNSS module; and
   (h) ruggedizing the housing to at least MIL-STD-810G (U.S. Department of Defense Test Method Standard for Environmental Engineering Considerations and Laboratory Tests);
   wherein the survey data collector is configured to capture engineering survey data including position data generated by the GNSS module.

16. The method of claim 15, wherein said disposing (b) further comprises the GNSS module being configured for positioning accuracy within a margin of error of 1 cm vertically and 2 cm horizontally.

17. The method of claim 15, comprising ruggedizing the survey data collector to at least MIL-STD-810G for one or more environmental conditions selected from the group of Operating and Storage Temperatures, Vibration, Drop/Shock, Sand & Dust, Water, Humidity, and combinations thereof.

18. The method of claim 17, further comprising ruggedizing the survey data collector to at least MIL-STD-810G for each of Operating and Storage Temperatures, Vibration, Drop/Shock, Sand & Dust, Water, and Humidity.

19. The method of claim 15, comprising configuring the housing for water and dust resistance to NEMA (National Association of Electrical Manufacturers) IP65 standards.

20. A self-contained, hand-held, wireless engineering survey data collection system, comprising:
   a survey data collector including:
      a housing having a hand-held, tablet, form factor;
      a processor, memory module, data storage, and power source disposed within the housing;
      a full personal computer operating system;
      a user interface including input and output devices supported by the housing and communicably coupled to the processor;
      the user interface including a sunlight viewable touch screen;
      a survey module including computer readable instructions disposed in a non-transitory computer readable medium, for configuring the processor, memory module, data storage, and user interface to capture and store engineering survey data;
      a plurality of communications ports configured for communicating with peripheral devices;
      a survey-grade GNSS (Global Navigation Satellite System) module disposed within the housing and communicably coupled to the processor, the GNSS module configured for positioning accuracy within a margin of error of 3 cm;
      an internal GNSS antenna supported within the housing in operative engagement with the GNSS module;
      the survey data collector being ruggedized to at least MIL-STD-810G (U.S. Department of Defense Test Method Standard for Environmental Engineering Considerations and Laboratory Tests) for each of Operating and Storage Temperatures, Vibration, Drop/Shock, Sand & Dust, Water, and Humidity;
      the survey data collector being water and dust resistant to NEMA (National Association of Electrical Manufacturers) IP65 standards;
      wherein the survey data collector is configured to capture engineering survey data including position data generated by the GNSS module.

\* \* \* \* \*